J. A. HUGGETT.
Shears for Cutting Horseshoe-Nails.
No. 198,543. Patented Dec. 25, 1877.
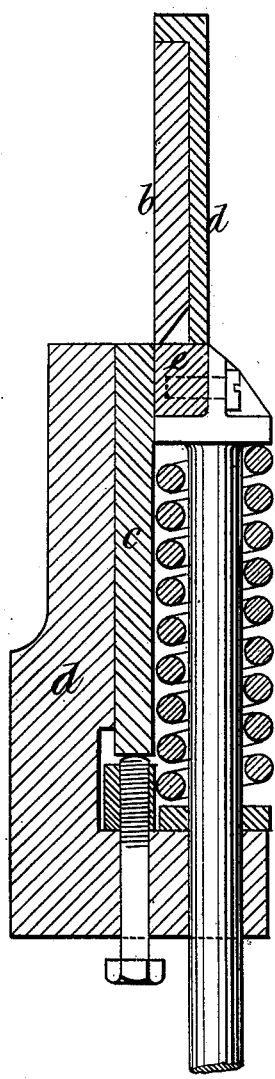
Fig: 3.
Fig: 1.
Fig: 2.
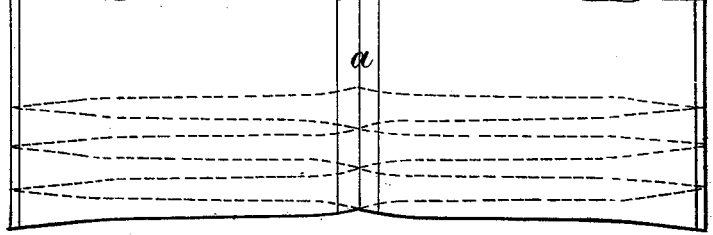
Fig: 4.
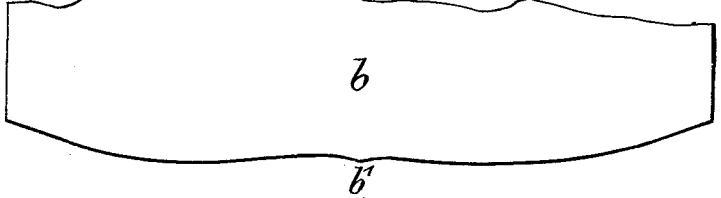
Fig: 5.
Fig: 6.
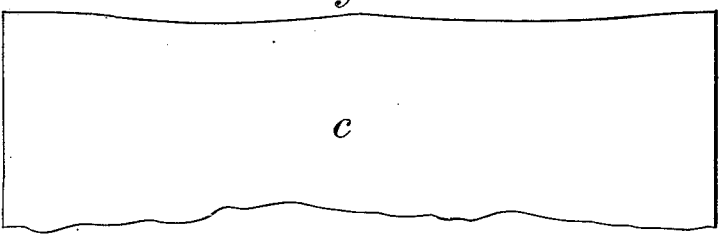
Witnesses
C. L. Parker
M. F. Connolly
Inventor John A. Huggett
By Attorney George H. Christy

UNITED STATES PATENT OFFICE.

JOHN ALBERT HUGGETT, OF CLAPHAM, ENGLAND.

IMPROVEMENT IN SHEARS FOR CUTTING HORSESHOE-NAILS.

Specification forming part of Letters Patent No. 198,543, dated December 25, 1877; application filed August 13, 1877.

*To all whom it may concern:*

Be it known that I, JOHN ALBERT HUGGETT, of 12 Ferndale Road, Clapham, in the county of Surrey, England, have invented new and useful Improvements in the Manufacture of Horse-Nails, which improvements are fully set forth in the following specification, reference being had to the accompanying drawings.

This invention has for its object improvements in the manufacture of horse-nails.

In the specification of a former patent granted to me, No. 181,784, in the year 1876, I have described the manufacture of horse-nails by rolling soft steel into a bar of a transverse section corresponding to the form of two nails placed end to end, and shearing up the bar transversely into nails by two sets of shears.

Nails thus made, however, in common with hand-made horse-nails, are open to the objection that they require to be pointed and set or bent to a proper curve by the shoeing-smith before they can be used.

By my present invention I obviate these objections by rolling a groove along the center of the bar from end to end, the sides of this groove being inclined according to the bevel or taper it is desired to give to the point of the nail. This groove is produced at the last passage of the bar between the rolls, and the groove is made as deep as will render the points as sharp as is desired, still, however, leaving the bar sufficiently strong to sustain the operation of shearing without parting the middle before the nails have been cut from it.

In order to give the desired set or curvature to the nails, in place of employing a straight-edged bottom cutter and a top cutter with an edge having a form corresponding to that of the face of the bar to be cut, I now give a curvature to both these parts, and also to the presser, so that they act to bend as well as to shear the bar, and the transverse bending of the bar gives the requisite curvature or "set" to the nails.

The bar may be rolled with the curvature upon it; but this is more troublesome, and the curvature of the cutting-edges and of the presser will still be necessary.

In order that my said invention may be most fully understood and readily carried into effect, I will proceed to describe the drawings hereunto annexed.

Figure 1 shows the transverse sectional form to which the steel bar from which the nails are to be cut is rolled. It is the same form as that described in the specification of my former patent, with the exception of the groove at *a*. This groove, as already stated, is rolled in the bar from end to end, and when the bar is cut up the sides of the groove form the bevel of the point of the nail. The material should be a very mild, ductile, and tenacious cast-steel, made from an iron as free as possible from sulphur and phosphorus. Suitable steel can be produced by the Bessemer and by the Siemens-Martin processes.

Fig. 2 shows a plan of the bar with the lines marked upon it, along which it is sheared to form horse-nails. As described in the specification of my former patent, two pairs of shears are employed. The bar is carried from one to the other. One pair of shears removes a waste piece from the end of the bar and shapes its end, and the other pair then cuts off two nails, and so on alternately.

Fig. 3 shows a transverse section of one pair of shear-cutters, with the parts in connection therewith. The figure may be taken to represent either the one pair of shears or the other, for they are identical in transverse section, and differ only in the contour of the edge, as seen in plan. This difference is sufficiently indicated by the dotted lines on Fig. 2. *b* is the upper cutter, and *c* is the lower. *d d* are the holders in which they are carried.

Fig. 4 shows a portion of the upper cutter *b* in face. This cutter has two peculiarities or features in which it differs from the corresponding cutter shown and described in the specification of my former patent—namely, it has a projection at *b'* corresponding to the groove *a* rolled in the bar, and the cutting-edge has a curvature throughout, as seen in Fig. 4, differing from that of the face of the bar along the line of the cut, and such that when this cutter acts with the lower cutter and presser, which have a corresponding peculiarity of form, the bar is bent by the tools, as well as cut by them.

Fig. 5 shows an end view of the bar after being acted upon by the tools.

Fig. 6 shows a portion of the lower cutter in face. It differs from the corresponding cutter shown and described in the specification of my former patent in being curved on the cutting-edge, as seen in this view, for the purpose of setting the nail, as already described, in place of being straight and corresponding to the flat under surface of the bar. *e* is the presser. It is mounted immediately behind the lower cutter, and it serves to support the portion of the bar which overhangs it, so that the cut may be effected without deforming the metal in other respects. The presser is supported by a powerful spring, as the drawing represents, and the lower cutter is supported upon a screw for the purpose of adjustment. As seen in face, the top of the presser *e* is curved at the top to the same form as the cutter *c*, and as shown in Fig. 6.

Having thus described the nature of my said invention, and the manner of performing the same, I would have it understood that I claim as my improvements in the manufacture of horse-nails—

The shear-cutters *b c*, having a form or contour of cutting-edge, substantially as described, whereby the nails are delivered with the set or curvature which they require for use.

J. A. HUGGETT.

Witnesses:
  CHAS. BERKLEY HARRIS,
    17 *Gracechurch Street, London.*
  ·G. W. WESTLEY,
    17 *Gracechurch Street.*